Figure 1:
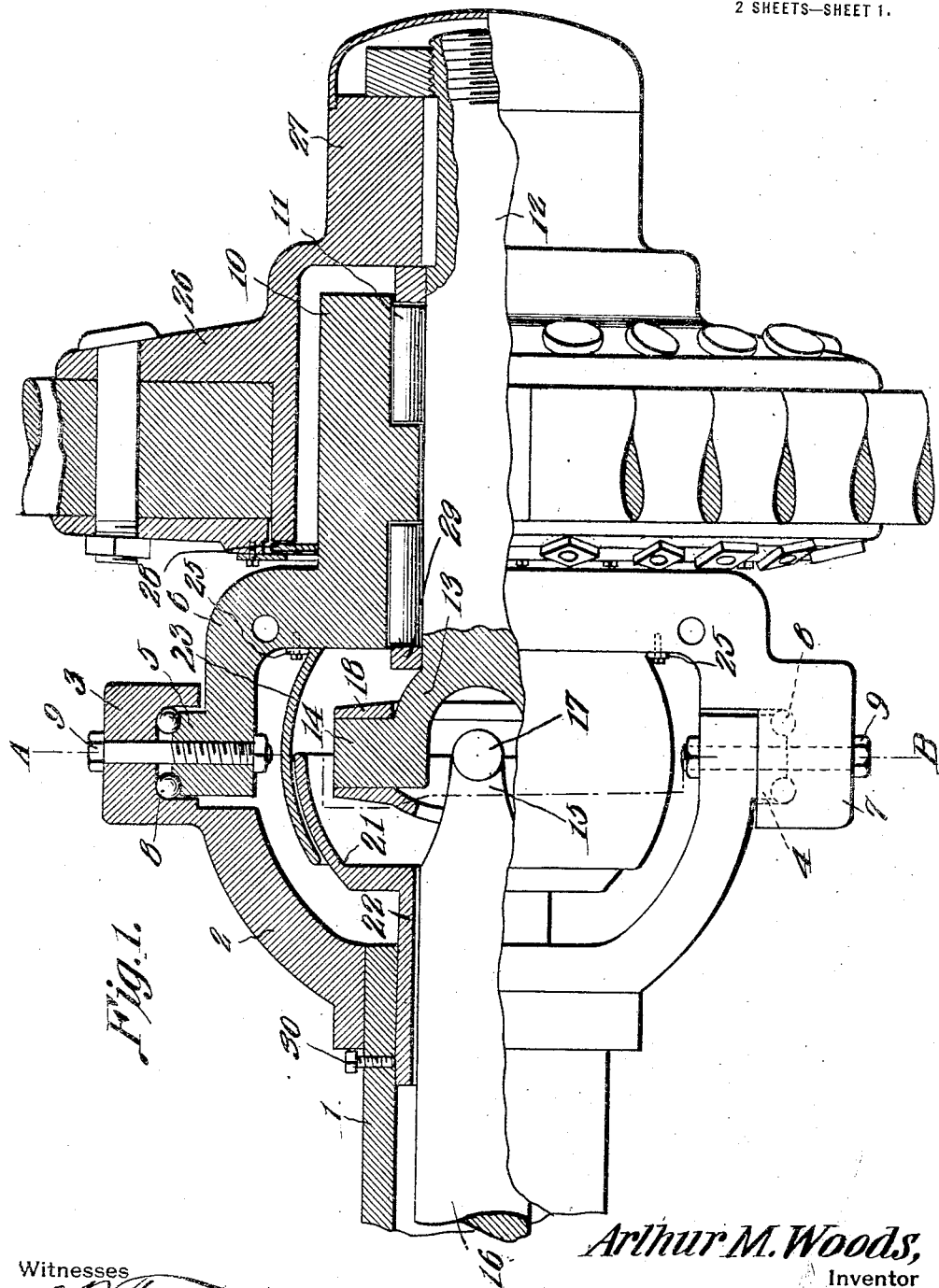

A. M. WOODS.
DRIVE FOR MOTOR VEHICLES.
APPLICATION FILED SEPT. 22, 1914.

1,182,955.

Patented May 16, 1916.
2 SHEETS—SHEET 1.

Arthur M. Woods,
Inventor

Witnesses by C. A. Snow & Co.
Attorneys

A. M. WOODS.
DRIVE FOR MOTOR VEHICLES.
APPLICATION FILED SEPT. 22, 1914.
1,182,955.
Patented May 16, 1916.
2 SHEETS—SHEET 2.
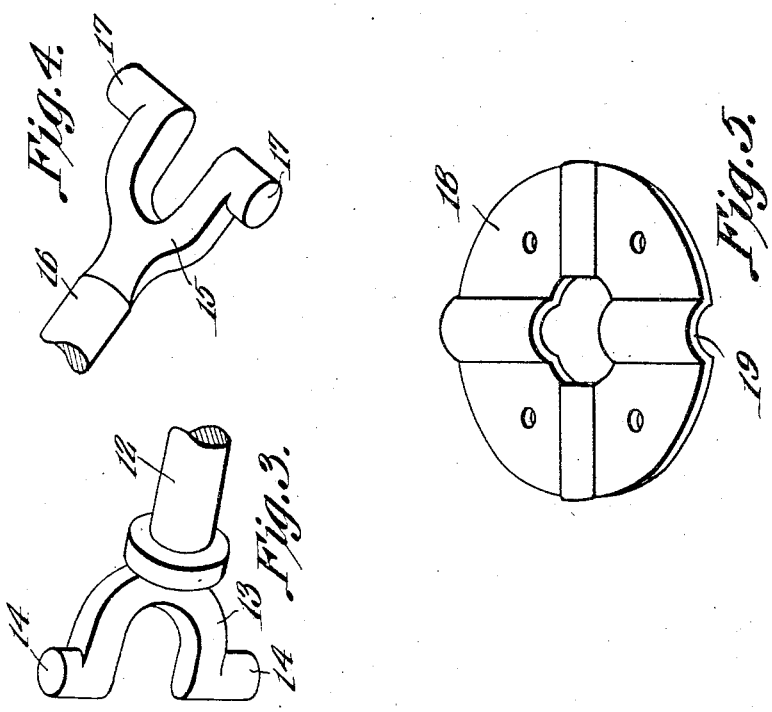
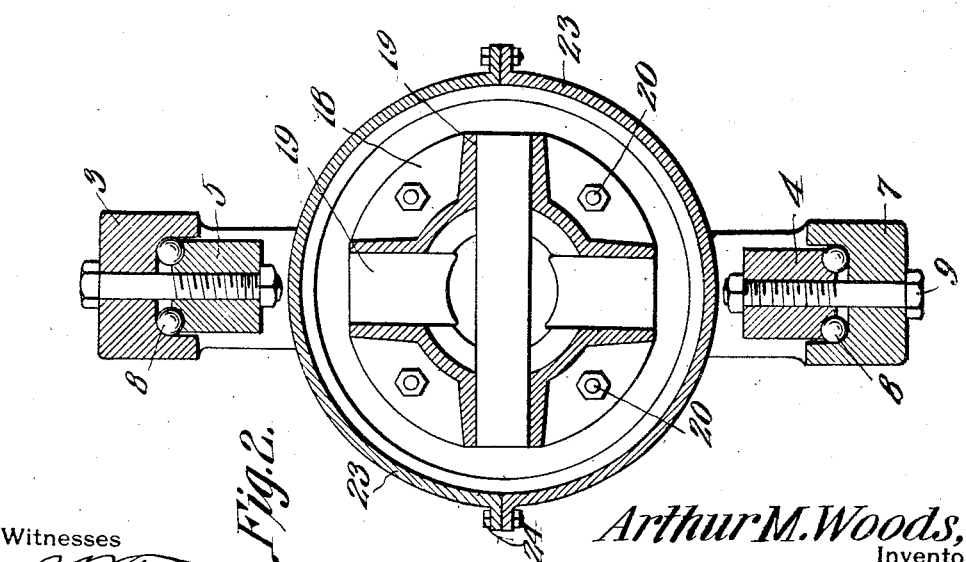
Arthur M. Woods,
Inventor

UNITED STATES PATENT OFFICE.

ARTHUR M. WOODS, OF BALSORA, TEXAS.

DRIVE FOR MOTOR-VEHICLES.

1,182,955. Specification of Letters Patent. Patented May 16, 1916.

Application filed September 22, 1914. Serial No. 863,043.

*To all whom it may concern:*

Be it known that I, ARTHUR M. WOODS, a citizen of the United States, residing at Balsora, in the county of Wise and State of Texas, have invented a new and useful Drive for Motor-Vehicles, of which the following is a specification.

This invention relates to drives for motor vehicles, its principal object being to provide means whereby the front wheels of a motor vehicle can be driven by a motor without interfering with the action of the wheels in steering.

A further object is to provide simple, durable and compact means for mounting and connecting the front wheels, the said mechanism being protected from dust and moisture and the various parts thereof being readily assembled or taken apart for the purpose of cleaning and repairing them.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a view partly in section and partly in elevation of the hub of a front wheel and of the adjacent means for driving the same. Fig. 2 is a section on line A—B Fig. 1, the members of the universal joint being removed. Fig. 3 is a perspective view of one member of the universal joint. Fig. 4 is a perspective view of the other member of said joint. Fig. 5 is a perspective view of one of the bearing rings of the universal joint.

Referring to the figures by characters of reference 1 designates a portion of the outer or tubular axle which is, in the present case, provided at the front end of the vehicle, this outer or tubular axle corresponding with that ordinarily employed in connection with the rear or usual driving wheels of a motor vehicle. A yoke 2 is connected to the end of the axle 1 and is provided at its ends with an upper bearing cup 3 and a lower bearing stud 4. The cup 3 is designed to receive an upwardly extending stud 5 formed upon the upper end of another yoke 6, the lower end of this yoke 6 being provided with a bearing cup 7 into which extends the stud 4. Suitable anti-friction devices such as balls 8 are provided for reducing friction between the stud and cup and connecting bolts 9 extend through the studs and cups as shown.

Yoke 6 has an integral extension 10 within which are housed anti-friction rollers 11 or the like constituting bearings for a spindle 12 which is mounted for rotation within the extension 10 and projects outwardly therebeyond. The inner end of the spindle 12 is provided with a yoke 13 having oppositely extending trunnions 14. This yoke 13 is disposed opposite and at right angles to another yoke 15 provided at the outer end of a drive shaft 16 mounted for rotation in the tubular axle 1. Yoke 15 has oppositely extending trunnions 17 disposed at right angles to the trunnions 14. The trunnions 14 and 17 are interposed between two bearing rings 18, each of which is provided with recesses 19 in which the trunnions are adapted to work, as shown particularly in Fig. 2. The rings are held together by means of bolts 20 and, when thus assembled, serve to prevent displacement of the yokes 13 and 15 relative to each other.

For the purpose of protecting the universal joint formed of the yokes 13 and 15 from dust and moisture, a housing is provided between the yokes 2 and 6. One of the members of the housing is substantially cup-shaped, as shown at 21 and has a sleeve 22 mounted on the shaft 16 and projecting into the axle 1. The other member of the housing is made up of oppositely disposed semi-circular bands 23 rounded transversely and detachably connected at their ends, as shown at 24. Ears 25 extend from the bands 23 and are detachably secured to the yoke 6 as shown. The member 21 is designed to fit snugly and to work within the other member of the housing during the movement of the yoke 6 relative to the yoke 2.

The hub 26 of the wheel is fitted loosely upon the extension 10 and is provided, on its outer side at the center thereof with a heavy boss or extension 27 which is keyed or otherwise secured upon the spindle 12. Thus it will be seen that the hub 26 will be held out of contact with the outer surface of the extension 10 by the spindle 12 and the rollers 11. Any suitable means such as a packing ring 28 can be provided for preventing the admission of dust and moisture into the space between the hub and the outer surface of the extension 10.

It will be apparent of course that by providing the yokes 2 and 6 connected in the manner disclosed the front wheel can be swung about the bolts 9 as an axis for the purpose of steering the vehicle. During this steering operation the yoke 13 will swing relative to the yoke 15 no matter in what position said yokes may be during their rotation under the action of the shaft 16. In other words, the yokes 13 and 15 and their connecting or bearing rings 18 form a universal joint so that motion will always be transmitted from shaft 16 to spindle 12 no matter what angular adjustment of the extension 10 relative to the axle 1 may be effected. Thus it will be seen that power can be transmitted directly to the front or steering wheels, the mechanism for this purpose being simple, durable and compact, completely protected from dust and moisture, and easily accessible for the purpose of making repairs or for cleaning.

By constructing and assembling the parts as described, the interfitting members 21 and 23 can be utilized as an oil cup from which oil will be distributed along the axis 16 and to the spindle 12, this oil container being of such capacity as to require renewing only after long intervals. A spacing collar 29 is mounted on the spindle 12 close to the yoke 13 and is designed to hold the yoke 13 properly positioned. Should this collar 29 become worn, the play can be taken up by inserting a washer. A sleeve 22 can be secured within the axle 1 in any suitable manner, as by means of a set screw 30.

What is claimed is:—

The combination with pivotally connected yokes, a tubular axle extending from one of the yokes, and a bearing extension upon the other yoke, of a spindle journaled within the bearing extension, a shaft within the tubular axle, a universal connection between the axle and spindle, a cup-like housing member partly housing the universal joint, a sleeve extending therefrom and shiftable longitudinally within the tubular axle to withdraw said housing member from around the universal joint, means within the axle and engaging the sleeve for holding said housing member in position about the universal joint, a housing member detachably connected to the yoke on the spindle and made up of opposed detachably connected segmental sections, said housing members normally fitting close together and coöperating to form a lubricant receptacle.

In testimony that I claim the foregoing as my own, I have hereto affixed my signature in the presence of two witnesses.

ARTHUR M. WOODS.

Witnesses:
J. M. GREGG,
BEN J. TRAMMELL.